United States Patent Office 2,959,609
Patented Nov. 8, 1960

2,959,609
PROCESS FOR PREPARING VINYL-PHOSPHONIC-ACID-BIS-(β-CHLORETHYL)-ESTER

Ernst Otto Leupold, Hofheim (Taunus), Germany, and Hermann Zorn, Vienna, Austria, assignors to Farbwerke Hoechst Aktiengesellschaft vormals Meister Lucius & Bruning, Frankfurt am Main, Germany, a corporation of Germany No Drawing. Filed Nov. 6, 1956, Ser. No. 620,581

5 Claims. (Cl. 260—461)

The present invention relates to a process of preparing vinyl-phosphonic-acid-bis - (β - chlorethyl) - ester of the formula

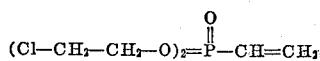

from β-chlorethyl-phosphonic-acid-bis - (β - chlorethyl)-ester of the formula

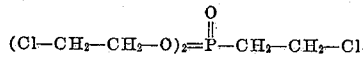

If hydrogen chloride is split off from β-chlorethyl-phosphonic-acid-bis-(β-chlorethyl)-ester in known manner by the action of organic or inorganic bases, there is obtained a mixture of various vinyl compounds which can be separated with great difficulties only and whose composition depends both on the amount of the organic or inorganic base employed and on the character of these bases since there may occur various side reactions, for example alcoholysis or ammonolysis.

Now we have found that the vinyl-phosphonic-acid-bis-(β-chlorethyl)-ester can be prepared with much better yields from the β-chlorethyl-phosphonic-acid-bis-(β-chlorethyl)-ester by carrying out the reaction at elevated temperatures in the presence of salts of organic acids having an alkaline reaction, especially alkali acetates, as agents splitting off hydrogen chloride. Alkali salts, for example the sodium-, potassium- or ammonium salts of the propionic-, butyric- or isobutyric acid, are also suitable for this purpose. The use of acetates and propionates is particularly advantageous on account of the fact that the free acids can be removed from the reaction mixture by simple evaporation. Furthermore, there may also be used mixtures of various salts, for example mixtures of salts of one and the same acid with different alkali metals and/or salts of one and the same alkali metal with different acids. If desired, there may also be added ammonium salts to the mixtures. These salts are used in an amount of at least 1 mol, calculated on the molar amount of hydrogen chloride to be split off, preferably, in an amount of about 1 to 2 mols. The use of alkali metal salts is also of special advantage.

It is very surprising that, by the process of the invention, a selective action sets in with regard to the splitting off of hydrogen chloride such that, even if a large excess of the aforementioned salts is employed, hydrogen chloride is split off only from the chlorethyl group which is directly bound to phosphorus. Thus, when operating at temperatures above 90° C., for example at temperatures ranging between 90° C. and 140° C.—advantageously between 110° C. and 130° C.—a crude product is obtained from which pure vinyl-ester may be prepared by simple distillation under reduced pressure. The reaction may take place in a solvent which is inert against the reactants, for example dioxane, ortho-dichloro-benzene or tetrahydronaphthalene. In this case the reaction may last over a prolonged period of time if solvents with a low boiling point are employed. Oxygen is suitably excluded from the present reaction by working under an atmosphere of $N_2$ or $CO_2$.

The working up of the reaction product may take place according to various obvious methods. If the reaction is carried out in the presence of a solvent, the reaction mixture may be simply filtered after the reaction and the filtrate may be purified by—if necessary, repeated—fractionation. If the treatment is carried out in the absence of a solvent, water may be added to the reaction product after cooling until the salt has been dissolved, then the reaction product is suitably washed with some water and distilled. After cooling the reaction product may also be suction-filtered immediately and the residue may be washed with solvents, for example carbon tetrachloride, and the filtrate which has been combined with the solution may be distilled, if necessary, after rinsing with water.

In the present invention it is of no importance whether the splitting off of the hydrogen chloride takes place immediately or whether primarily the chlorine is replaced by the carboxyl group of the organic acid, for example by the acetoxy group, and secondarily only the vinyl compound is formed by splitting off the acid.

When working according to the process of the invention, it is not necessary to use pure β-chlorethyl-phosphonic-acid-bis-(β-chlorethyl)-ester; there may also be used the crude product and/or the crude solution which were obtained by heating for example crude tris-(β-chlorethyl)-phosphite to temperatures above 180° C., in the presence of an inert, polar solvent boiling at temperatures above 180° C.—preferably not above 220° C.—such as ortho-dichloro-benzene.

Vinyl-phosphonic-acid-bis-(β-chlorethyl)-ester is suitable for rendering cellulose-containing materials flame-resistant, for instance paper, wood, textiles; it can be polymerized alone or together with other suitable compounds and may be employed as intermediary product for the manufacture of other organic compounds, for example insecticides and plasticizers.

The following examples serve to illustrate the invention but they are not intended to limit it thereto:

Example 1

27 grams of β-chlorethyl-phosphonic-acid-bis-(β-chlorethyl)-ester (0.1 mol) are boiled for 10 hours under slow reflux with 24.6 grams (0.3 mol) of sodium acetate in 100 cc. of dioxane. After cooling, the mixture is suction-filtered and the filtrate is distilled in vacuo. There are obtained 17.6 grams (=75% yield) of a fraction which distils over at 112° C. to 145° C. under a pressure of 0.2 mm. and which, after it has again been distilled, yields 15.6 grams (=66% yield) of vinyl-phosphonic-acid-bis-(β-chlorethyl)-ester boiling at 110° C. to 112° C. under a pressure of 0.4 mm.

Example 2

A crude product, which was prepared by boiling at 140° C. for 12 hours, while stirring, a limped ethoxylation product obtained at 0° C. from 138 parts of phosphorus trichloride and 3 mols of ethylene oxide, is kept at a temperature of 110° C. for 2 hours with 110 parts of sodium propionate. After cooling, water is added until the salt has been dissolved and two layers have formed. The reaction product forming the lower layer is separated and twice shaken with a little water. The distillation yields 123 parts (=52% yield calculated upon amount of $PCl_3$) of vinyl ester, boiling at 110° C. to 112° C. under a pressure of 0.4 mm.

Example 3

After the addition of 105 parts of potassium acetate, the same amount of the crude product as used in Example 2 is heated at 100° C. for 5 hours and suction-filtered after cooling. The residue is dissolved in water and shaken with carbon tetrachloride. This solution is combined with the filtrate and twice rinsed with water. The distillation yields 115 parts of vinyl ester.

*Example 4*

In the presence of 539 parts of ortho-dichloro-benzene, 539 parts of β-chlorethyl-phosphonic-acid-bis-(β-chlorethyl)-ester are treated with 164 parts of sodium acetate for 3 hours at a temperature of 120° C. to 130° C. After cooling, the solution is stirred with water and the crude product is fractionated in vacuo. There are obtained 400 parts of pure vinyl ester (=86% of the theoretical yield).

*Example 5*

A solution, which was prepared by heating an ethoxylation product, obtained at 0° C. to 25° C. from 825 parts of phosphorus trichloride with 817 parts of ethylene oxide (103% of the theoretical amount), in the presence of 1640 parts of orthodichloro-benzene for 3 hours at a temperature of 180° C. to 190° C., is mixed at 90° C. with 550 parts of sodium acetate (112% of the theoretical amount). The solution is then heated for three hours at 115° C. to 120° C. After cooling, the solution is stirred with water and the reaction product is fractionated in vacuo. There are obtained 1008 parts of vinyl-phosphonic-acid-bis-(β-chlorethyl)-ester boiling at 106° C. to 110° C. under a pressure of 0.2 mm. which amount to 72% of the theoretical yield, calculated upon the amount of PCl₃ used.

*Analysis.*—Calculated Cl: 30.5%; found 30.58%. P: 13.3%; found 12.97%. Iodine hydrogen number: 109; found 109.3.

We claim:

1. A process for producing the vinyl-phosphonic-acid-bis-(β-chlorethyl)-ester, which comprises heating β-chlorethyl-phosphonic-acid-bis-(β-chlorethyl)-ester to a temperature in the range of from 90° C. to 140° C. in the presence of 1-2 mols of at least one alkali metal salt of at least one saturated fatty acid containing 2-4 carbon atoms, the molar amount being calculated on the molar amount of hydrogen chloride to be split off.

2. A process for producing the vinyl-phosphonic-acid-bis-(β-chlorethyl)-ester, which comprises heating β-chlorethyl-phosphonic-acid-bis-(β-chlorethyl)-ester to a temperature in the range from 110° C. to 130° C. in the presence of 1-2 mols of at least one alkali metal salt of at least one saturated fatty acid containing 2-4 carbon atoms, the molar amount being calculated on the molar amount of hydrogen chloride to be split off.

3. A process for producing the vinyl-phosphonic-acid-bis-(β-chlorethyl)-ester, which comprises heating β-chlorethyl-phosphonic-acid-bis-(β-chlorethyl)-ester at a temperature in the range from 90° C. to 140° C. in the presence of an excess of at least one alkali salt of at least one saturated fatty acid containing from 2 to 4 carbon atoms.

4. A process according to claim 3, wherein the reaction is carried out in the presence of a solvent that is inert to the reactants.

5. A process for producing vinyl-phosphonic-acid-bis-(β-chlorethyl)-ester, which comprises heating β-chlorethyl-phosphonic-acid-bis-(β-chlorethyl)-ester at a temperature in the range from 90° C. to 140° C. in the presence of an excess of an alkali salt of a saturated fatty acid containing from 2 to 4 carbon atoms.

References Cited in the file of this patent

UNITED STATES PATENTS

| | | |
|---|---|---|
| 2,557,805 | Upson | June 19, 1951 |
| 2,598,729 | Teeter | June 3, 1952 |

OTHER REFERENCES

Kabachnik: "Chem. Abst.," 42, col. 4132 (1948).

Gefter: "Uspekhi Khim," 25, No. 2 pp. 162–189, (1956), A.T.S. English Translation Rj–619, p. 3.